Feb. 17, 1970    M. WESLEY    3,495,833
MULTILAYER GEOGRAPHICAL PUZZLE

Filed March 8, 1967    2 Sheets-Sheet 1

INVENTOR.
MARY WESLEY
BY

Feb. 17, 1970         M. WESLEY         3,495,833
MULTILAYER GEOGRAPHICAL PUZZLE
Filed March 8, 1967         2 Sheets-Sheet 2
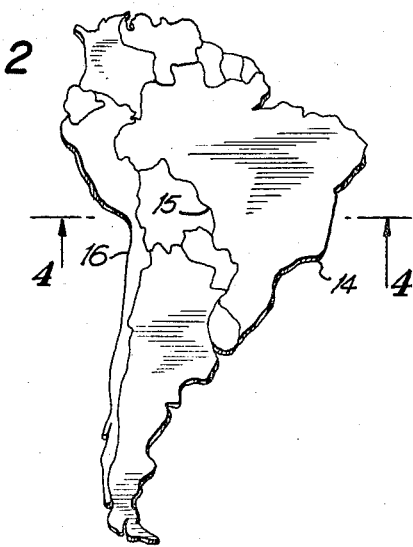
FIG.2
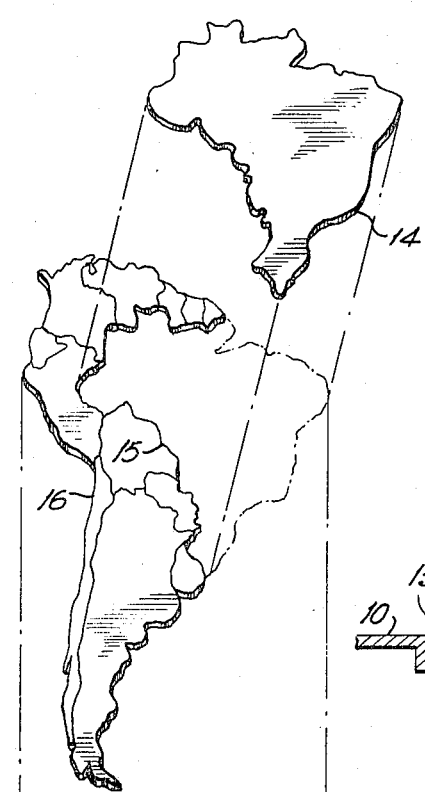
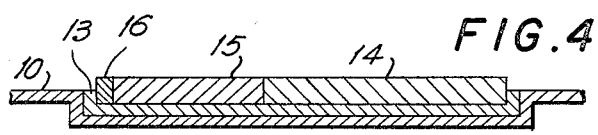
FIG.4
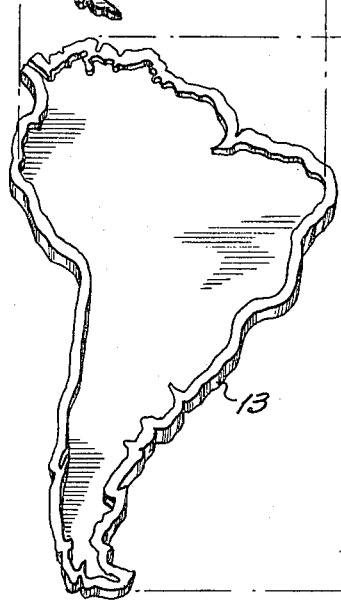
FIG.3
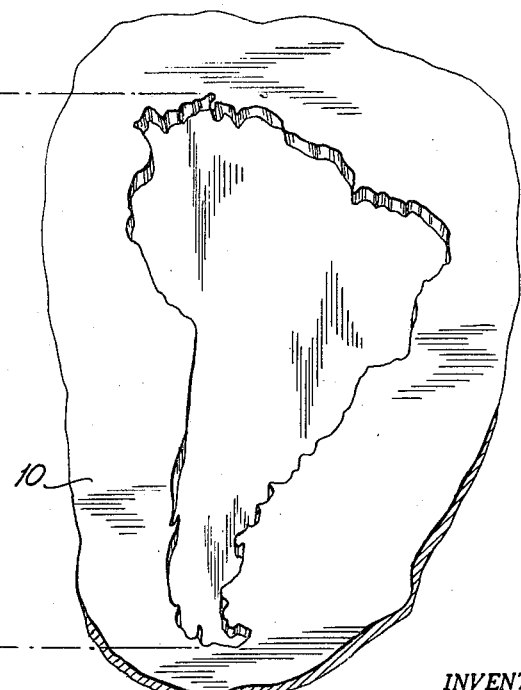
INVENTOR.
MARY WESLEY United States Patent Office 3,495,833
Patented Feb. 17, 1970

3,495,833
MULTILAYER GEOGRAPHICAL PUZZLE
Mary Wesley, 60 E. 9th St., New York, N.Y. 10003
Filed Mar. 8, 1967, Ser. No. 621,703
Int. Cl. A63f 9/12
U.S. Cl. 273—157                                    6 Claims

ABSTRACT OF THE DISCLOSURE

A game for teaching the skills of geography and history utilizing multilayered game board having a geographical area recessed within its surface and provided with a plurality of playing pieces defining the profiles of topographical or political boundaries of countries. Playing pieces are provided for one or more players which subdivide each of the two hemispheres into continents. The continents are further subdivided into topographical areas, or political subdivisions defining countries for a particular period in history. The profile pieces defining the various countries are placed in recessed slots of continental trays which are in turn placed in recessed slots on each hemisphere defined within the game board.

---

This invention relates to a jig-saw puzzle that may be utilized for amusement and for education.

More specifically, this invention relates to a jig-saw puzzle defining the geography and history of the world wherein one or more persons will assemble it in a plurality of stages starting with the continent and ending with a particular state, within a country, within the continent.

The modern trend is to provide games for children and adults which serve not only as a source of amusement but also as a means for teaching the players skills related to particular topics. In the present state of the art there are available many games which not only provided amusement but also teach the skills of geography, history, English grammar, vocabulary and finance.

With respect to games which teach the player a skill in recognizing countries in their location on the map, the shape and size of the countries are generally displayed on a map in blank so that the player need only identify the country by name. After these conventional games have been played a few times it becomes easy for the player to memorize the answers to the game in order to succeed in its completion. These games suffer from the disadvantage in that the players, after learning the many positions of the pieces in the game, become disinterested and no longer remain amused by continued playing.

Accordingly, the present invention provides a geographical and historical game for amusement and educational purposes which includes a geographical area such as a planar projection of the map of the world presented as a multilayer jig-saw puzzle. The bottom layer, forming the base of the game board, provides the overall outline of the map of the world, including the oceans, and inserts for the various continents and countries. The next layer, which is adapted to fit onto the first layer, includes in outline the five major continents of the world. Within each of the continents of the world is left a hollow space sufficient for receiving as a third layer each of the individual countries or states within the continent. The geographical game according to the invention thus requires a higher degree of skill from the player so that he must not only recognize the continents and the countries, but also the individual states that fit into the countries.

The game may also be utilized as a historical educational device by providing players with pieces defining the map of the world for each century of development beginning with the Roman empire, for example. It is further contemplated that territorial pieces may be provided for the political changes that have occurred as a result of the two world wars of the 20th century.

It is therefore an object of the present invention to provide a game which teaches the player a simultaneous understanding of geography and history.

It is another object according to the present invention to provide a geographical game in the form of a jig-saw puzzle for which players assemble the map of the world in a plurality of stages.

It is another object according to the present invention to provide a geographical game which utilizes a multilayer jig-saw puzzle of a planar projection of the world.

It is a further object according to the present invention to provide an educational game which is simple in design, easy to manufacture, and inexpensive in cost.

Other objects and features of the present invention will become apparent from the following detailed description considered in connection with the accompanying drawings, which disclose the embodiments of the present invention. It should be understood however that the drawings are designed for the purpose of illustration only and not as a definition of the limits of the invention as to which reference should be made in the appended claims.

In the drawings wherein similar reference characters denote similar elements throughout the several views;

FIG. 2 is a detailed plan view showing the jig-saw outline of the states of one of the continents;

FIG. 3 is an exploded view illustrating the assembly of the continent of FIG. 2 into the game board of FIG. 1; and FIG. 4 is a cross-sectional view taken along line 4—4 of FIG. 2.

Figure 1:
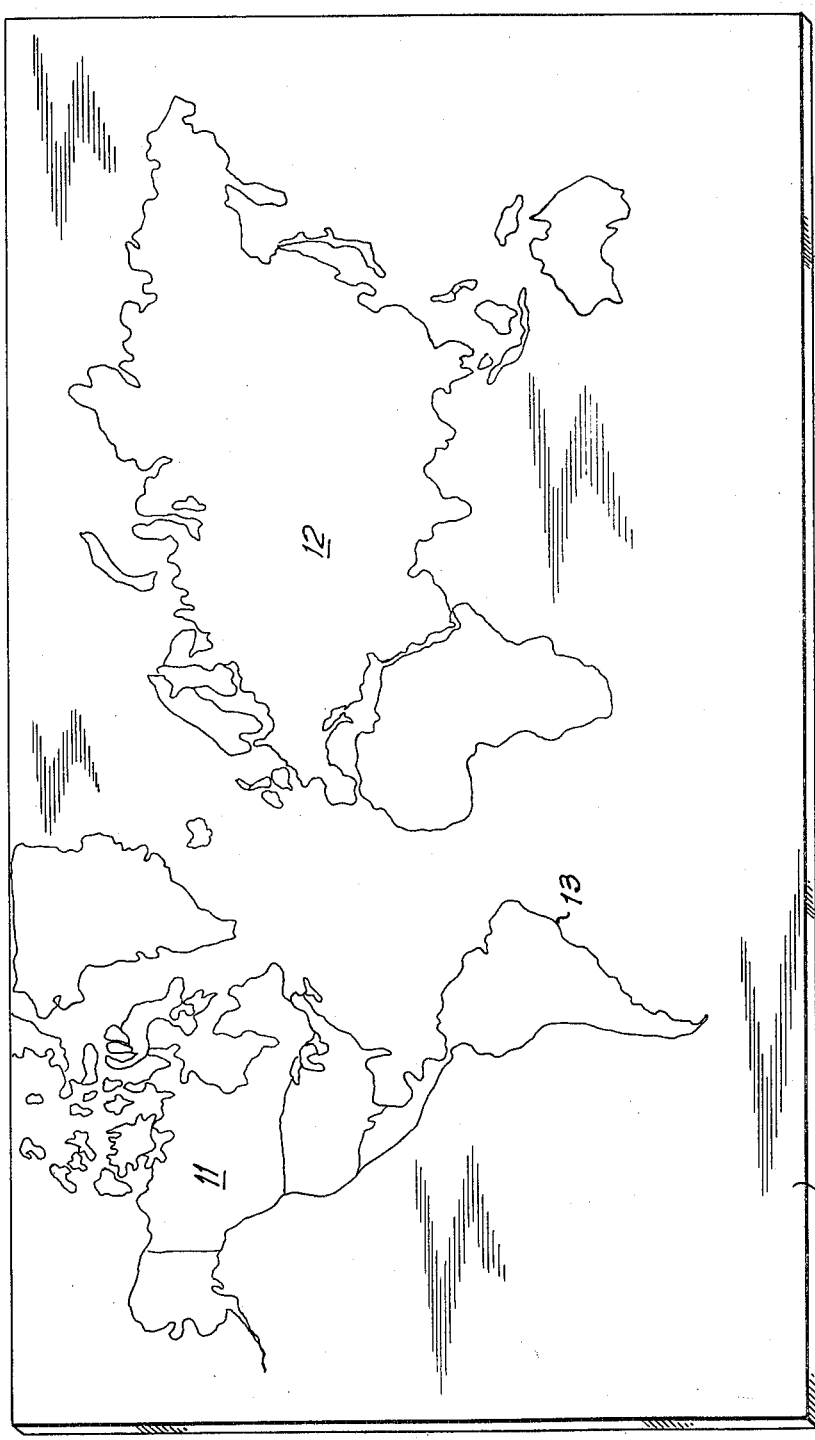
FIG. 1 is a plan view of the game board according to the invention showing a projection of the map of the world.

Referring to FIG. 1 there is shown a game board 10 illustrating one possible embodiment of the invention, wherein a map of the world is disposed thereacross illustrating the five major continents. Game board 10 is constructed from wood, plastic, or the like, with a predetermined depth into which is inserted jig-saw representations of each of the continents of eastern hemisphere 12 and western hemisphere 11. These jig-saw representations of each of the continents are constructed in turn so that they may receive the insertion of individual countries or states. To illustrate the concept of the invention, the continent of South America 13 is considered in detail with respect to the various included states.

In FIG. 2 the various countries such as Brazil 14, Bolivia 15, and Chile 16, are illustrated as distinct jigsaw puzzle pieces which when assembled properly define continent 13.

Referring to FIG. 3, the outline of continent 13 is constructed from a shallow tray adapted to fit snugly into hemisphere portion 11 of game board 10. The smaller pieces 14–16 defining a few of the various countries of continent 13 may then be assembled one at a time within the shallow tray. When all of the pieces defining a profile of each of the countries have been assembled in their proper location within continental tray 13, they will fit snugly together to form a distinct map of the continent of South America. The total assembly of country and continental pieces are then inserted into the game board 10.

FIG. 4 illustrates a cross-section taken through line 4—4 of FIG. 2 illustrating the various levels that are assumed by the playing pieces after the game has been completely assembled. Set into the appropriate continental location on the surface, or seat, of game board 10 is shown continental tray 13 which includes a shallow depth less than the depression in board 10. Into the depression of continent 13 are inserted the playing pieces defining the various states of that continent, such as the profile pieces of Brazil 14, Bolivia 15 and Chile 16. The countries 14–16 have a thickness slightly greater than the depression within continent 13 in order to facilitate removal during the operation of the game.

For the purposes of illustration, the playing pieces comprising countries 14-16 may be numbered or colored differently to enhance the appearance of the game and to define more distinctly the political boundaries in relation to the various countries. It is contemplated that the continents and countries would be colored in relation to one another to facilitate learning for the younger players.

The geographical game according to the invention may also be utilized in the teaching of history by providing additional playing pieces defining the map of the world into political districts as they existed in different periods of time in history. For example, it is conceivable that as the players advance in skill and knowledge, or as a visual aid for a particular academic class of students, they may wish to begin playing the game at the start of the Roman empire and proceed in time through history by replacing each of the political subdivisions with new pieces as the countries became defeated in war, created by war, or colonized and later given independence. It may also be possible to insert in place of country 14 an additional tray defining the profile of country 14 into which would be placed a plurality of pieces representing each of the various political or governmental divisions of the country.

It is also possible to provide the players with topographical representations of each country defining the mountains and plains areas throughout the world. In this particular embodiment the political subdivision become unimportant so that it is possible to cut the pieces in any number of ways to force the players to recognize important topographical features of each country. The topographical representations may be printed on flat playing pieces or provided as a relief map, in which case the pieces contain three dimensional reliefs.

It is contemplated that along with the playing pieces representing topographical or political subdivision throughout history that historical background information will be provided to each player to aid him in selecting the proper playing pieces during the operation of the game.

While only a single embodiment of the present invention has been shown and described, it is obvious that modifications may be made therein.

What is claimed is:
1. A multiplayer geographical game comprising:
   a flat board having a plurality of recesses disposed on the surface of said board defining geographical boundaries,
   a plurality of trays each having an upstanding rim peripherally extending from a flat bottom shaped for snug insertion into said recesses, and
   a plurality of interconnecting pieces defining boundaries for snug insertion within the upstanding rim of each of said trays.
2. The game as recited in claim 1 wherein said plurality of pieces have a thickness sufficient to project out of the plane of said board surface.
3. The game as recited in claim 1 wherein said board defines a map of the world and each of said recesses defines a continent.
4. The game as recited in claim 3 wherein the periphery of said trays define the outline of a continent.
5. The game as recited in claim 4 wherein each of said pieces defines a political subdivision.
6. The game as recited in claim 5 wherein each of said adjoining pieces is colored differently from one another.

References Cited

UNITED STATES PATENTS

| | | | |
|---|---|---|---|
| 3,432,961 | 3/1969 | Goldfarb | 273—157 |
| 1,739,861 | 12/1929 | Roberts | 35—46 |
| 173,988 | 2/1876 | Nichols | 35—41 |
| 1,071,358 | 8/1913 | Matthews. | |
| 2,373,258 | 4/1945 | Olsen | 35—41 |
| 2,535,619 | 12/1950 | Wright | 273—157 X |

FOREIGN PATENTS 280,278    11/1927    Great Britain.

ANTON O. OECHSLE, Primary Examiner

U.S. Cl. X.R.

35—21, 42